N. F. AMBURSEN.
CART FOR DISTRIBUTING CONCRETE, &c.
APPLICATION FILED AUG. 27, 1907.
932,746.
Patented Aug. 31, 1909.
2 SHEETS—SHEET 1.
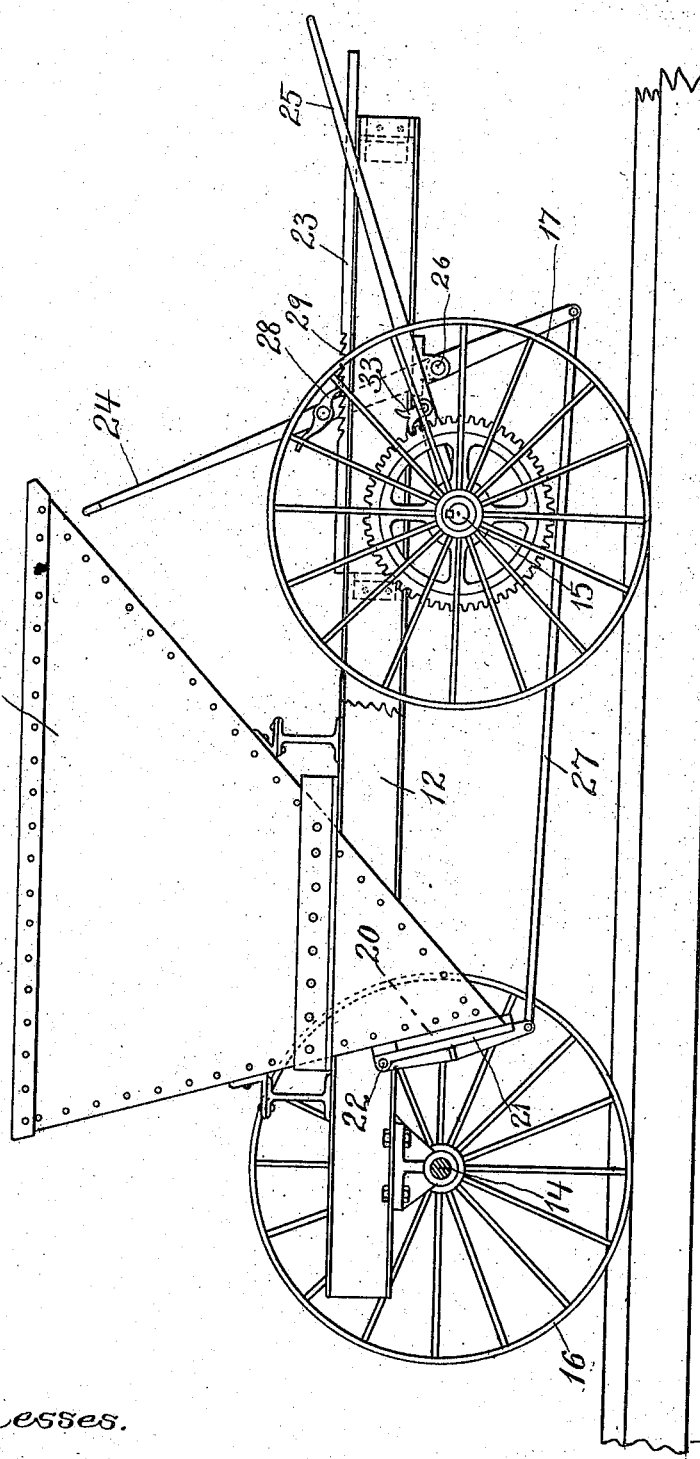
Witnesses.
Inventor.

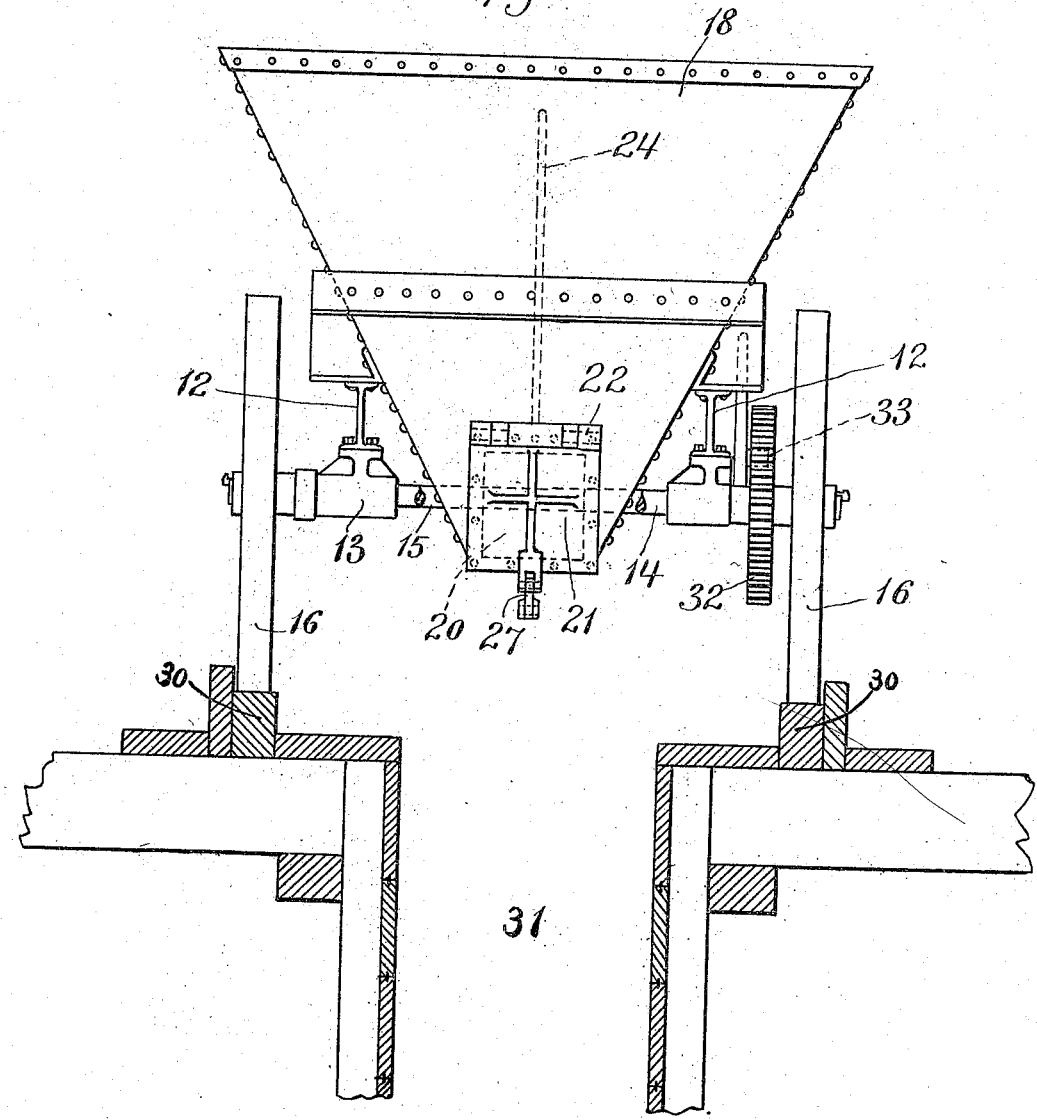

UNITED STATES PATENT OFFICE.

NILS FREDRICK AMBURSEN, OF NEWTON, MASSACHU

CART FOR DISTRIBUTING CONCRETE, &c.

932,746.     Specification of Letters Patent.     Patented Aug. 31, 1909.

Application filed August 27, 1907. Serial No. 390,314.

*To all whom it may concern:*

Be it known that I, NILS FREDRICK AMBURSEN, of Newton, in the county of Middlesex and State of Massachusetts, have invented certain new and useful Improvements in Carts for Distributing Concrete, &c., of which the following is a specification.

This invention has for its object to provide a cart adapted to be conveniently loaded with concrete or other like material at a central or receiving point, and to transport the material, and deliver the same at various points more or less distant from the receiving point, the invention being particularly designed for use in filling spaces between forms prepared for the erection of concrete walls and other structures.

The invention is embodied in a cart comprising a frame or body mounted on suitable wheels, a hopper-shaped body or receptacle mounted on the frame, and having a laterally contracted outlet adapted to discharge the load at a point between the wheels at opposite sides of the cart without liability of being deposited in the path of the wheels, means being provided whereby the operator standing on the supporting frame, may open and close the outlet, and may propel the cart in either direction, so that after the cart is loaded, it may be propelled to any point more or less distant from the loading point, where its contents may be discharged.

Of the accompanying drawings forming a part of this specification,—Figure 1 represents a side elevation of a cart embodying my invention. Fig. 2 represents a rear elevation, portions of the frame being broken away in each of the views, and certain parts shown in section.

The same numerals of reference indicate the same parts in all the figures.

My improved distributing cart comprises a supporting frame which in this embodiment of my invention is composed of parallel I-beams 12, suitable cross bars connecting said beams, and bearings 13 attached to the beams 12, the axles 14 15 of the supporting wheels 16 17 being journaled in said bearings. 18 represents a hopper mounted on the supporting frame, and suitably affixed thereto, the hopper being of tapering form and enlarged at its upper portion, and contracted at its lower portion, the latter extending downwardly between the I-beams 12, and being provided at its lower portion with a discharge outlet 20 and with a gate 21 which is hinged at 22, and is adapted to close the outlet. The supporting frame is provided with a platform 23, constituting a support or station for an operator, said support being preferably located at one end of the frame.

Located in suitable operative proximity to the support 23 are levers 24 and 25. The lever 24 is fulcrumed at 26 to the supporting frame, and the lever 25 is fulcrumed on the axle 15. Said levers are so arranged that they may be operated by a person standing on the platform or support 23. The lever 24 is connected by a rod 27 with the gate 21, and is adapted to be locked in the position shown in Fig. 1 by suitable means, such as a dog 28 carried by the lever, and one or more ratchet teeth 29 affixed to the platform. When the lever is thus locked, it holds the gate 21 closed. When the lever is released it permits the gate to swing open under the pressure against it of the charge of material in the hopper. When the gate is opened, the material slides down the inclined bottom of the hopper, and is delivered between the wheels at opposite sides of the cart. Said wheels preferably run on tracks 30, which are located at opposite sides of forms which constitute a cavity for the reception of a mass of concrete, the forms 31 molding the concrete deposited between them into a wall or other structure. The tracks 30 extend parallel with and at opposite sides of the form 31, the arrangement being such that the material discharged from the hopper through the opening 20, enters and is distributed in the cavity according to the position of the hopper at the time of the discharge. The lever 25 forms a part of a propelling mechanism adapted to move the cart along the tracks. Said mechanism includes a gear 32 affixed to the axle 15, and a double-pointed or reversible ratchet 33 pivoted to the lever 25, and adapted to engage the teeth of the gear 32 in either of two positions, so that the gear may be rotated in one direction by an upward movement of the lever, when the dog is in the position shown in Fig. 1, and in the opposite direction, by a downward movement of the lever, when the dog is swung over to the opposite position. In practice the cart is located in position to receive a charge of concrete from a mixing apparatus, the gate 21 being locked to retain the charge in the hopper. The operator then by manipulating the lever 25, propels the cart to the point where the load is to be discharged, and then by manipulating the lever 24, releases the gate, and permits the discharge of the load. The gate may then be closed, and the cart propelled in the opposite direction back to the starting point.

Owing to the fact that the discharge outlet is laterally contracted, although its lower end is above the horizontal plane of the lowermost portions of the wheels, the material discharged is practically prevented from being so deposited as to lie in the path of the wheels. As shown in Fig. 2, the material will drop directly into the form 31. If the hopper and the discharge outlet therefrom were of such lateral dimensions as to anywhere nearly approach the space between the wheels, the material would almost certainly be so deposited as to result in derailing the cart. This is of especial advantage where the cart is to be propelled both forward and backward by an operator riding thereon, particularly for the special purpose described which requires a number of trips back and forth on the tracks or rails in order to fill the form 31. The position of the lower end of the hopper above the bottom of the wheels, enables the cart to be used in the manner above mentioned, viz., to be loaded at one point and then moved to a more or less distant location where the fill is to be made.

It will be seen that by providing a support for the operator, and gate-operating and propelling mechanism having members such as the levers 24 and 25 located in operative proximity to the support so that they may both be manipulated by an operator standing thereon, the cart is adapted to be conveniently operated by a single attendant.

I claim:

1. A distributing cart, comprising a wheeled supporting frame having a support for an operator, a hopper mounted on the frame, and having a laterally contracted discharge outlet, a gate adapted to close the outlet, means for locking and releasing said gate, and mechanism for propelling the cart, said mechanism including an operating member operatively related to said support.

2. A distributing cart comprising a wheeled supporting frame having a support for an operator, a hopper mounted on the frame, and having a laterally contracted discharge outlet, a gate adapted to close the outlet, means for locking and releasing said gate, and mechanism for propelling the cart, said mechanism including an operating member operatively related to said support and having provisions for propelling the cart in either direction.

In testimony whereof I have affixed my signature, in presence of two witnesses.

NILS FREDRICK AMBURSEN.

Witnesses:
H. L. COBURN,
W. L. CHURCH.